(12) United States Patent  
Boyum (10) Patent No.: US 6,641,235 B2
(45) Date of Patent: Nov. 4, 2003

(54) PIVOTING TRACK TENSIONING SYSTEM FOR A TRACKED VEHICLE

(75) Inventor: Lee Stephen Boyum, St. Peter, MN (US)

(73) Assignee: Jarraff Industries Inc., St. Peter, MN (US)

( * ) Notice: Subject to any disclaimer, the term of this patent is extended or adjusted under 35 U.S.C. 154(b) by 0 days.

(21) Appl. No.: 09/859,215

(22) Filed: May 16, 2001

(65) Prior Publication Data

US 2002/0171290 A1 Nov. 21, 2002

(51) Int. Cl.$^7$ .............................................. B02D 55/00
(52) U.S. Cl. .................. 305/143; 305/144; 305/145
(58) Field of Search ................................ 305/143, 144, 305/145, 148, 149, 150, 153, 156

(56) References Cited

U.S. PATENT DOCUMENTS

| | | |
|---|---|---|
| 1,401,625 A | 12/1921 | Mader |
| 2,452,671 A | 11/1948 | Merrill |
| 3,889,769 A | 6/1975 | Blomstrom et al. |
| 4,227,748 A * | 10/1980 | Meisel, Jr. .................. 305/143 |
| 4,537,267 A | 8/1985 | Satzler |
| RE32,442 E | 6/1987 | Satzler |
| 4,681,177 A | 7/1987 | Zborowski |
| 4,893,883 A | 1/1990 | Satzler |
| 5,031,973 A * | 7/1991 | Gillet .......................... 305/143 |
| 5,318,141 A | 6/1994 | Hansen |
| 5,409,075 A | 4/1995 | Nieman |
| 5,988,775 A * | 11/1999 | Nordberg .................... 305/143 |
| 6,027,185 A * | 2/2000 | Crabb ......................... 305/148 |
| 6,315,374 B1 * | 11/2001 | Johansson ................... 305/145 |
| 6,354,678 B1 * | 3/2002 | Oertley ....................... 305/144 |

FOREIGN PATENT DOCUMENTS

JP          3224876 A   *  3/1991    ................. 305/145

* cited by examiner

Primary Examiner—S. Joseph Morano
Assistant Examiner—Long Bao Nguyen
(74) Attorney, Agent, or Firm—Merchant & Gould P.C.

(57) ABSTRACT

A track tensioning system for a tracked vehicle having both a frame with left and right side members as well as left and right tracks that are both configured to translate along the ground to move the vehicle includes left and right wheel plates located substantially adjacent to a respective side member. Left and right wheels are coupled to the respective left and right wheel plates. The left and right wheels are coupled to the left and right tracks and rotate on a rotational axis so that, as the tracks translate along the ground, both wheels rotate with the tracks. For providing track tensioning to the tracks, each wheel plate pivots against the respective side member of the frame on a pivot axis that is displaced form the rotational axis. The left and right wheel plates may pivot in substantially parallel pivot planes. The substantially parallel pivot planes may be vertical. The left wheel plate may pivot around a left pivot axis and the right pivot plate may pivot around a right pivot axis. The left pivot axis and right pivot axis may be collinear. The left wheel plate and right wheel plate may be coupled together with a bolt extending along the pivot axis. The wheel plates may each be pivotably coupled to the frame with a bushing.

32 Claims, 10 Drawing Sheets

PIVOTING TRACK TENSIONING SYSTEM FOR A TRACKED VEHICLE

BACKGROUND OF THE INVENTION

Track-driven machines typically require a system for maintaining proper tension in the tracks. The tension in the tracks must be sufficient to provide a driving friction force between a drive wheel and the track, but may not be so large as to damage the machine components or the track.

Improved methods and systems for tensioning tracks are needed. A track may be tensioned by biasing a wheel that engages the track. Various systems have been provided for tensioning a track by biasing a wheel.

SUMMARY OF THE INVENTION

A track tensioning system for a tracked vehicle having left and right tracks includes a biasing system for simultaneously providing track tensioning to both tracks by biasing each track through a track-tensioning arc. The biasing system may include a linear force-generating system for generating a track-tensioning force. The linear force-generating system may for example be a spring or a piston and cylinder assembly. The biasing system may also include a pivoting rocker arm assembly for transmitting the track-tensioning force from the linear force-generating system to the tracks.

In another embodiment, a track tensioning system for tensioning a left and right track on a tracked vehicle includes a left track tensioning wheel arranged and configured to engage the left track, a right track tensioning wheel arranged and configured to engage the right track, a force generating system for providing a track tensioning force, and a coupling system arranged and configured to couple the left track tensioning wheel and right track tensioning wheel to the force generating system. The left track tensioning wheel may be rotatable around a left rotation axis and pivotable in a left pivot plane around a left pivot axis that is displaced from the left rotation axis. The right track tensioning wheel may be rotatable around a right rotation axis and pivotable in a right pivot plane around a right pivot axis that is displaced from the right rotation axis.

The coupling system may be arranged and configured to couple the left track tensioning wheel and right track tensioning wheel to the force generating system for transmitting the biasing force from the force generating system to the left and right track tensioning wheels for tensioning the left and right track. The coupling system may include a rocker plate that is pivotably coupled to the force generating system for balancing the tension in the left and right tracks. The rocker plate may be coupled to the force generating system with a spherical bearing. The system may also include a left wheel plate that couples the rocker plate to the left track tensioning wheel and a right wheel plate that couples the rocker plate to the right track tensioning wheel. The rocker plate may be coupled to the left wheel plate with a left spherical bearing and coupled to the right wheel plate with a right spherical bearing. The tracked vehicle may define orthogonal X, Y, and Z axes and the rocker plate may be pivotable around each of the X, Y and Z axes.

The left pivot plane and right pivot plane may be substantially parallel. The left pivot plane and right pivot plane may also be substantially vertical. The rocker plate may have a neutral position in which the rocker plate is substantially perpendicular to the left pivot plane and right pivot plane.

The force generating system may include a piston and cylinder assembly. The piston and cylinder assembly may include a first end and a second end, the second end being coupled to the rocker plate by the spherical bearing. The frame may include portions defining a pocket for receiving the first end of the piston and cylinder assembly.

The track tensioning system may also include a bolt that couples the left wheel assembly to the right wheel assembly.

In another embodiment, a track tensioning system for simultaneously tensioning left and right tracks on a tracked vehicle includes a frame, left and right wheel plate assemblies that are each coupled to the frame, a rocker plate that is coupled to the left and right wheel plate assemblies, and a cylinder assembly having a front end and a back end, the front end being pivotably coupled to the rocker plate, the back end being supported by the frame. The cylinder assembly may be actuated to bias the rocker plate and the left and right wheel plate assemblies to tension the left and right tracks. The rocker plate may pivot to balance the tension in the left and right tracks.

The left wheel plate assembly may include a left wheel that is rotatable around a left wheel rotation axis and arranged and configured to engage the left track. The left wheel plate assembly may be pivotable in a left pivot plane around a left pivot axis that is displaced from the wheel rotation axis. The right wheel plate assembly may include a right wheel that is rotatable around a wheel rotation axis and arranged and configured to engage the right track. The right wheel plate assembly may be pivotable in a right pivot plane around a right pivot axis that is displaced from the wheel rotation axis. The left pivot plane may be substantially parallel to the right pivot plane. The left and right pivot planes may be substantially vertical. The left wheel rotation axis and right wheel rotation axes may be substantially parallel to the respective left and right pivot axis. The rocker plate may have a neutral position in which the rocker plate is substantially perpendicular to the left and right wheel plate assemblies. The rocker plate may be pivotable in three dimensions relative to the cylinder assembly. The rocker plate may be coupled to the cylinder assembly with a spherical bearing. The cylinder assembly may move through a substantially vertical cylinder pivot plane. A constant pressure may be maintained in the cylinder assembly for automatically adjusting the tension in the tracks.

The left and right wheel plate assemblies may each be pivotable in three dimensions relative to the rocker plate. The left and right wheel assemblies may each be coupled to the rocker plate with a spherical bearing.

The frame may include a left supporting surface and a right supporting surface. The left wheel plate assembly may be slidably supported by the left supporting surface of the frame and the right wheel plate assembly may be slidably supported by the right supporting surface of the frame. The left wheel plate assembly may be laterally displaced a distance from the right wheel plate assembly. The left and right supporting surfaces of the frame may prevent the left and right wheel plate assemblies from moving inward out of alignment with the tracks. The rocker plate may prevent the left and right wheel plate assemblies from moving outward out of alignment with the tracks.

The left and right wheel plate assemblies may each be coupled to the rocker plate with a spherical bearing. The system may include a shaft coupled to each end of the rocker plate. Each shaft may include a body for engaging a spherical bearing and a threaded end extending outwardly beyond the spherical bearing. The system may also include a nut engaged on the threaded end of each shaft. The system may also include a bolt that couples the left plate assembly to the right plate assembly.

The left wheel assembly and right wheel assembly may each include a drive wheel that is coupled to a hydraulic drive motor. The left wheel assembly may include a drive plate, a gear system housing coupled to the drive plate, and a gear system contained within the gear system housing, the gear system being coupled to the hydraulic motor and the drive wheel. The gear system may include a planetary gear system.

The system may also include a relief valve for relieving pressure in the cylinder to permit retraction of the left and right wheel plate assemblies when the interaction of the track tensioning system with a stationary object causes a pressure spike.

In another embodiment, a method of adjusting the tension in a left and right track on a tracked vehicle includes providing a frame, a left track tensioning system arranged and configured to bias the left track through an arc for tensioning the left track, a right track tensioning system arranged and configured to bias the right track through an arc for tensioning the right track, a cylinder assembly for providing a track tensioning force, and a load coupling and balancing system for coupling the cylinder assembly to the left track tensioning system and the right track tensioning system. The load coupling and balancing system may include a rocker arm that is coupled to the left track tensioning system and the right track tensioning system. The method may further include the step of extending the cylinder assembly to increase the tension in the tracks, and retracting the cylinder assembly to decrease the tension in the tracks. The method may also include pivoting the rocker plate to balance the tension in the two tracks.

The method may also include the step of providing a constant pressure in the cylinder assembly. The constant pressure in the cylinder assembly may cause the cylinder assembly to extend in response to a reduction in tension in the tracks.

In another embodiment, a track tensioning system includes a frame having a left side and a right side, a cylinder assembly pivotably coupled to the frame, a rocker assembly coupled to the cylinder assembly with a spherical bearing, a left track interface assembly that is pivotably coupled to the left side of the frame, and a right track interface assembly that is pivotably coupled to the right side of the frame. The cylinder assembly may include a cylinder and a piston slidably disposed within the cylinder. The rocker assembly may include a rocker arm. The left track interface assembly may include a left side plate that is coupled to the rocker assembly with a spherical bearing and a left wheel that is arranged and configured to interface with a left vehicular drive track. The left wheel may be rotatably coupled to the left side plate. The right track interface assembly may include a right side plate that is coupled to the rocker assembly with a spherical bearing and a right wheel that is arranged and configured to interface with a right vehicular drive track. The right wheel may be rotatably coupled to the right side plate.

The tension in the first and second vehicular drive tracks may be adjusted by sliding the piston in the cylinder to actuate the rocker arm and pivot the first track interface assembly and second track interface assembly around the pivot axis.

The track left and right track interface assemblies may each include a drive mechanism. The drive mechanism may include a hydraulic drive motor. The track interface assembly may also include a left pivot member extending inwardly for pivotably coupling the left track interface assembly to the frame.

In another embodiment, a track tensioning system for a tracked vehicle having both a frame with left and right side members as well as left and right tracks that are both configured to translate along the ground to move the vehicle includes left and right wheel plates located substantially adjacent to a respective side member. Left and right wheels are coupled to the respective left and right wheel plates. The left and right wheels are coupled to the left and right tracks and rotate on a rotational axis so that, as the tracks translate along the ground, both wheels rotate with the tracks. For providing track tensioning to the tracks, each wheel plate pivots against the respective side member of the frame on a pivot axis that is displaced form the rotational axis. The left and right wheel plates may pivot in substantially parallel pivot planes. The substantially parallel pivot planes may be vertical. The left wheel plate may pivot around a left pivot axis and the right pivot plate may pivot around a right pivot axis. The left pivot axis and right pivot axis may be collinear. The left wheel plate and right wheel plate may be coupled together with a bolt extending along the pivot axis. The wheel plates may each be pivotably coupled to the frame with a bushing.

In another embodiment, a system for tensioning a track includes a track tensioning wheel for engaging and tensioning a track, a biasing system for providing a track tensioning force, a frame having a planar surface member that defines a pivoting plane, and a pivoting wheel plate that is coupled to the track tensioning wheel and to the biasing system. The track tensioning wheel may be rotatable around a wheel rotation axis. The pivoting wheel plate may be supported substantially against the planar surface member of the frame and may be pivotable in the pivoting plane around a pivot axis that is displaced from the wheel rotation axis. The pivoting wheel plate may slide substantially against the planar surface member of the frame as the pivoting wheel plate pivots to tension a track. The pivoting plane may be substantially vertical.

The system may include a second pivoting wheel plate and a second track tensioning wheel for engaging a second track. The frame may include a second planar surface that defines a second pivoting plane, the second pivoting wheel plate being supported against the second planar surface and being pivotable in the second pivoting plane. The second pivoting wheel plate may slide against the second planar surface of the frame as the second pivoting wheel plate pivots to tension a second track.

The system may also include a coupling system for coupling the wheel plates together. The coupling system may include a rocker arm that couples the pivoting wheel plate assemblies together. The rocker arm may pivot to balance the tension in the first and second tracks. The system may also include side plate spherical bearings that couple the wheel plate assemblies to the rocker arm.

The system may also include a pivot tube for coupling the pivoting wheel plate to the frame. The frame may include a frame tube for receiving the pivot tube, the frame tube having an inner diameter that is larger than the outer diameter of the pivot tube for rotatably supporting the pivot tube.

In another embodiment, a track tensioning system for balancing the track tension forces in left and right tracks on a tracked vehicle includes a frame, a left wheel plate assembly that is coupled to the frame, a right wheel plate assembly that is coupled to the frame, and a rocker arm member that is coupled to the frame and to the left and right wheel plate assemblies. The left wheel plate assembly may include a left wheel that is rotatable around a left wheel rotation axis, the left wheel plate assembly being pivotable in a left pivot plane around a left pivot axis that is displaced from the left wheel rotation axis. The left wheel plate assembly may be arranged and configured to engage the left track. The right wheel plate assembly may include a right wheel that is rotatable around a right wheel rotation axis, the right wheel plate assembly being pivotable in a right pivot plane around a right pivot axis that is displaced from the right wheel rotation axis. The right wheel plate assembly may be arranged and configured to engage the right track. The rocker arm member may transfer track tension forces between the left track and the right track, and the left wheel plate assembly and right wheel plate assembly may pivot to balance the tension in the tracks.

The left pivot plane may be substantially parallel to the right pivot plane. The left and right pivot planes may be substantially vertical. The rocker arm member may have a neutral position in which the rocker arm member is substantially perpendicular to the left and right wheel plate assemblies. The left wheel rotation axis may be substantially parallel to the left pivot axis.

The left and right wheel plate assemblies may each be pivotable in three dimensions relative to the rocker arm member and may be coupled to the rocker arm member with a spherical bearing. The rocker arm member may be pivotable in three dimensions relative to the frame and may be coupled to the frame with a rocker spherical bearing. The rocker spherical bearing may be coupled to a linkage which is coupled to the frame The frame may include a left supporting surface and a right supporting surface. The left wheel plate assembly may be slidably supported by the left supporting surface of the frame and the right wheel plate assembly may be slidably supported by the right supporting surface of the frame.

The left wheel plate assembly may be laterally displaced a distance from the right wheel plate assembly. The left and right supporting surfaces of the frame may prevent the left and right wheel plate assemblies from moving inward out of alignment with the tracks. The rocker arm member may prevent the left and right wheel plate assemblies from moving outward out of alignment with the tracks. A bolt may also be provided to couples the left plate assembly to the right plate assembly.

The left and right wheel plate assemblies may each be coupled to the rocker arm member with a spherical bearing. A shaft may be coupled to each end of the rocker arm member. Each shaft may include a body for engaging a spherical bearing and a threaded end extending outwardly beyond the spherical bearing. A nut may be engaged on the threaded end of each shaft.

The left wheel assembly and right wheel assembly may each include a drive wheel that is coupled to a hydraulic drive motor. The left wheel assembly may include a drive plate, a gear system housing coupled to the drive plate, and a gear system contained within the gear system housing, the gear system being coupled to the hydraulic motor and the drive wheel. The gear system may include a planetary gear system.

In another embodiment, a rocker arm assembly for a track tensioning system on the tracked vehicle includes a rocker arm member that is coupled to the frame and is pivotable around the X, Y, and Z axes defined by a vehicle frame. A tracked vehicle has a left and a right track, a left and a right wheel assembly each engaging a respective track, and a frame defining orthogonal X, Y, and Z axes. The rocker arm member may also be coupled to the left and right wheel assemblies, so that the rocker arm member may transmit track tensioning forces to the left and right wheel assemblies for tensioning the tracks. The rocker arm assembly may also include a spherical bearing for coupling the rocker arm member to the frame. Left and right spherical bearings may also be used for coupling the rocker arm member to respective left and right wheel assemblies. The rocker arm member may include a narrowed center portion for coupling the rocker arm to a linkage member. The rocker arm assembly may be adapted and configured for coupling to a piston and cylinder assembly.

In another embodiment, a track tensioning system for a tracked vehicle having left and right tracks includes a constant-force biasing system for automatically and simultaneously providing track tensioning to both tracks by biasing each track through a track-tensioning arc. The track tensioning system may include a linear force-generating system for generating a track-tensioning force. The linear force-generating system may include a spring. Alternatively, the linear force-generating system may include a piston and cylinder assembly, and a constant pressure may be provided in the piston and cylinder assembly. The constant force biasing system may also include a pivoting rocker assembly for transmitting the track-tensing force from the linear force-generating system to the tracks. The pivoting rocker assembly may be pivotable around orthogonal X, Y, and Z axes. This coupling arrangement may permit the rocker arm assembly to be pivoted such that the left track is biased through a degree of displacement through the track tensioning arc and the right track is biased through a degree of displacement through the track tensioning arc that is different from the degree of displacement of the left track. To couple the biasing system to the tracks, the rocker arm assembly may be coupled to a left track tensioning wheel and a right track tensioning wheel that are coupled to a respective left and right track.

In another embodiment, a tracked vehicle has left and right tracks and a balanced track tensioning system. The balanced track tensioning system includes a biasing system for providing balanced track tensioning to both tracks by independently biasing each track through a track-tensioning arc. The biasing system may include a pivoting rocker assembly for transmitting a track-tensing force to the tracks. The rocker assembly may be pivotable around X, Y, and Z axes that are defined by the balanced track tensioning system. The rocker arm assembly may be pivoted such that the left track is biased through a degree of displacement through the track tensioning arc and the right track is biased through a degree of displacement through the track tensioning arc that is different from the degree of displacement of the left track, wherein the left track and right track may be biased independently to balance the tension in the left and right tracks. For coupling the biasing system to the tracks, the rocker arm assembly may be coupled to a left track tensioning wheel and a right track tensioning wheel which are coupled to a respective left and right track.

In another embodiment, a tracked vehicle has a left, a right track and a track tensioning relief system. The track tensioning relief system may include a left and right track tensioning system each configured to tension a respective track, a force-generating system for providing a track-tensioning force, a coupling system for coupling the force-generating system to the left and right track tensioning systems, and a force-limiting system for restricting the amount of force provided by the force-generating system. The force-generating system may include a hydraulic piston and cylinder assembly. The force-limiting system may include a hydraulic pressure relief valve. The left track tensioning system may include a frame and a track tensioning wheel that is rotatably coupled to the frame to rotate around a rotation axis. The track tensioning wheel may be pivotably coupled to the frame to pivot around a pivot axis that is displaced from the rotation axis. Each track tensioning wheel may be configured to engage the a respective track, so that pivoting the left track tensioning wheel around the pivot axis tensions the left track.

Another embodiment includes a cylinder coupling system for coupling a hydraulic cylinder to a track tensioning system. A track tensioning system for a track vehicle may include a hydraulic cylinder for generating a track-tensioning force. A cylinder coupling system for coupling the cylinder to the track tensioning system includes a cylinder endcap that is coupled to the hydraulic cylinder assembly, a linkage arm having orthogonal X, Y, and Z axes, a spherical bearing that is coupled to the linkage arm, and a shaft that is coupled to the spherical bearing and the cylinder endcap. The cylinder endcap may have portions defining a slot for receiving the linkage arm. The cylinder endcap may also have portions defining a bore for receiving the shaft. The cylinder coupling system may permit the linkage arm to pivot around each of the X, Y, and Z axes.

DETAILED DESCRIPTION

Figure 1:
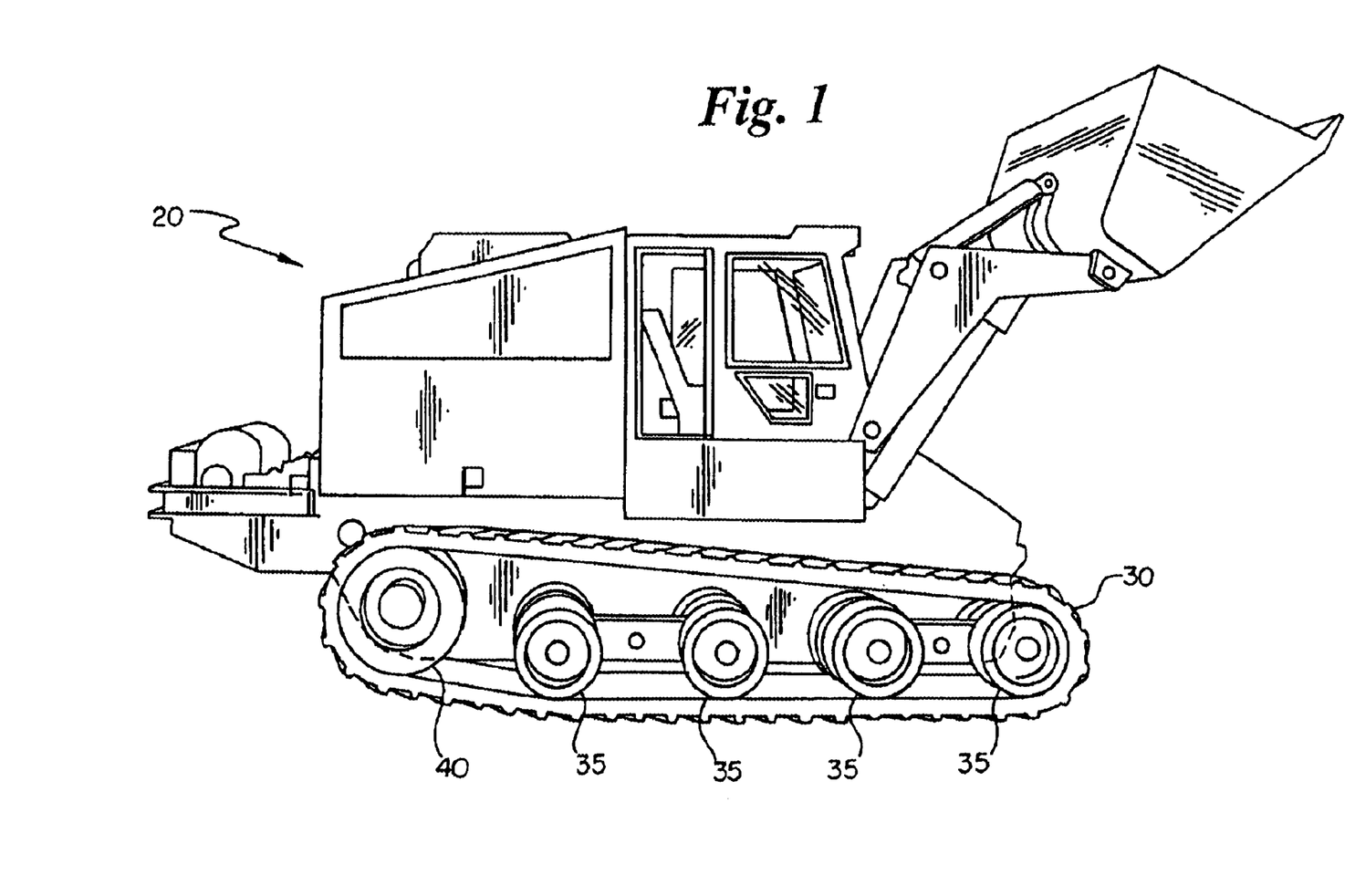
FIG. 1 is a perspective view of a tracked vehicle having a track tensioning system.

A tracked machine 20 as shown in FIG. 1 has two or more tracks 25, 30 that typically each engage a plurality of wheels 35, 40. A left track 25 is mounted on a left side 26 of the machine 20 and a right track 30, shown in FIG. 1, is mounted to a right side 31 of the machine. In the embodiments shown, the left and right tracks 25, 30 each engage a plurality of weight-bearing wheels 35 that support the weight of the tracked machine. Each track is also shown to engage a track tensioning wheel 40. The position of the track tensioning wheel 40 may be adjusted to increase or decrease the tension in the track. The track tensioning wheel 40 as shown in FIG. 1 may be biased upwardly and rearwardly through to tension the right track 30.

Figure 2:
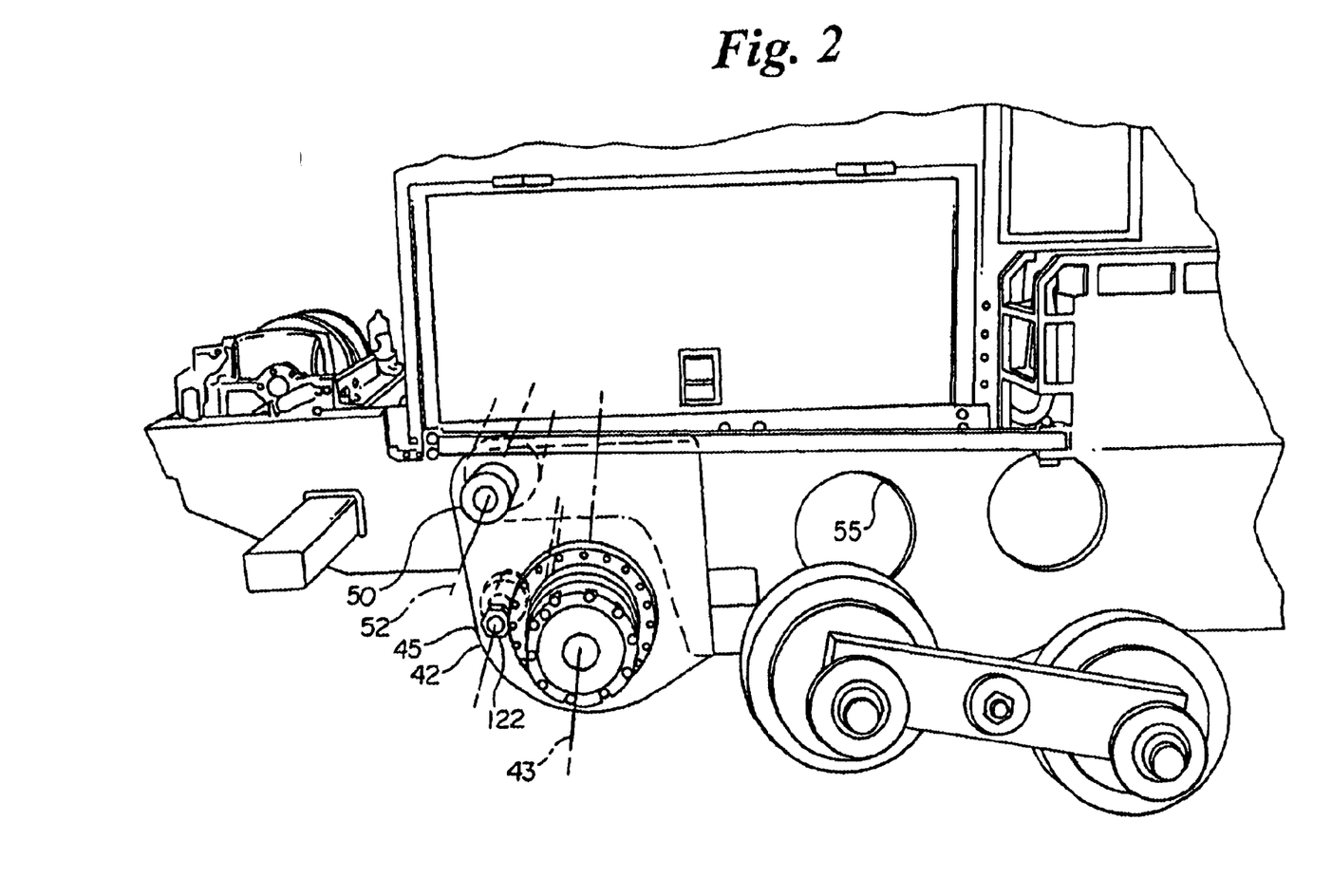
FIG. 2 is a fragmentary perspective view of the tracked vehicle of FIG. 1 showing a track tensioning system.
Figure 3:
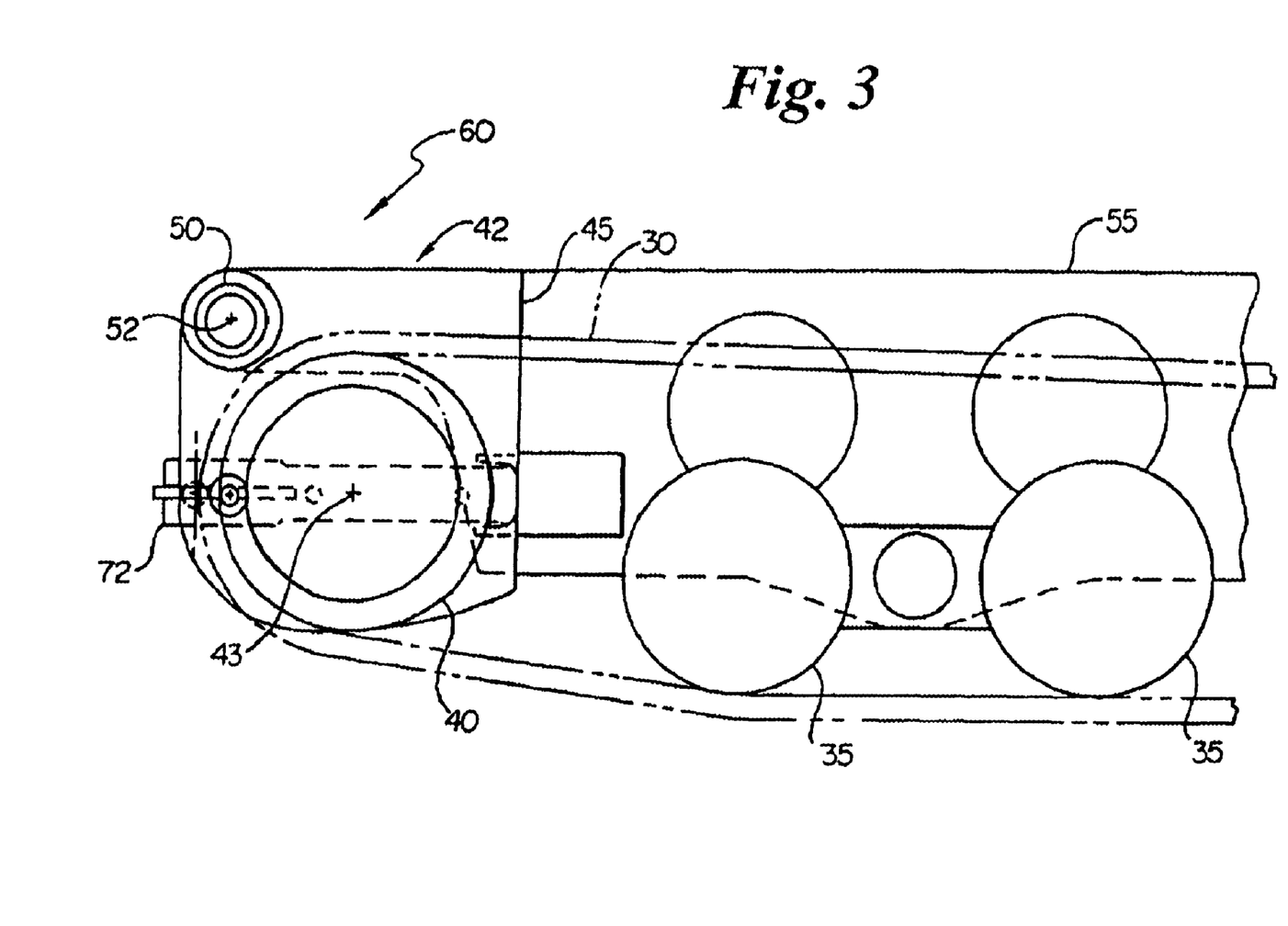
FIG. 3 is a fragmentary side elevational view of a track tensioning system having a cylinder assembly in a retracted position.
Figure 4:
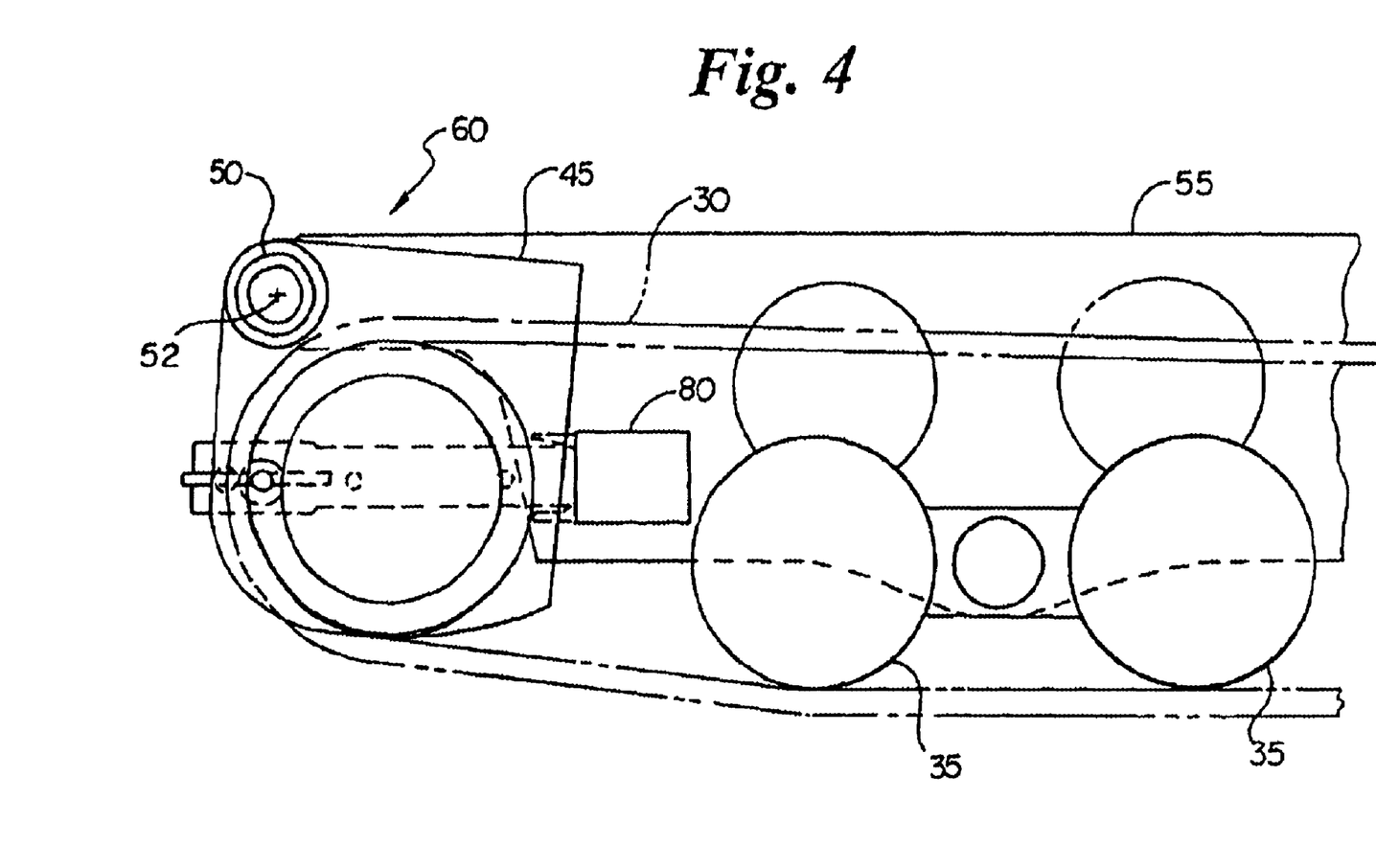
FIG. 4 is a fragmentary side elevational view of a track tensioning system showing the cylinder assembly of FIG. 3 in an extended position.

Improved track machine 20 features a track tensioning system 60, shown in FIGS. 2–7, that uses a single cylinder assembly 65 to bias both tensioning wheels 40 and tension both tracks 25, 30 equally and simultaneously. The system includes left and right wheel plate assemblies 41, 42. The right wheel plate assembly 42 is shown in FIGS. 2–4. Each wheel plate assembly includes a pivoting side plate or wheel plate 45. Each wheel plate assembly also includes a track tensioning wheel 40 that is rotatably coupled to the pivoting side plate 41, 42. The track tensioning wheel 40 is rotatable around a rotation axis 43, shown in FIG. 2.

Figure 5:
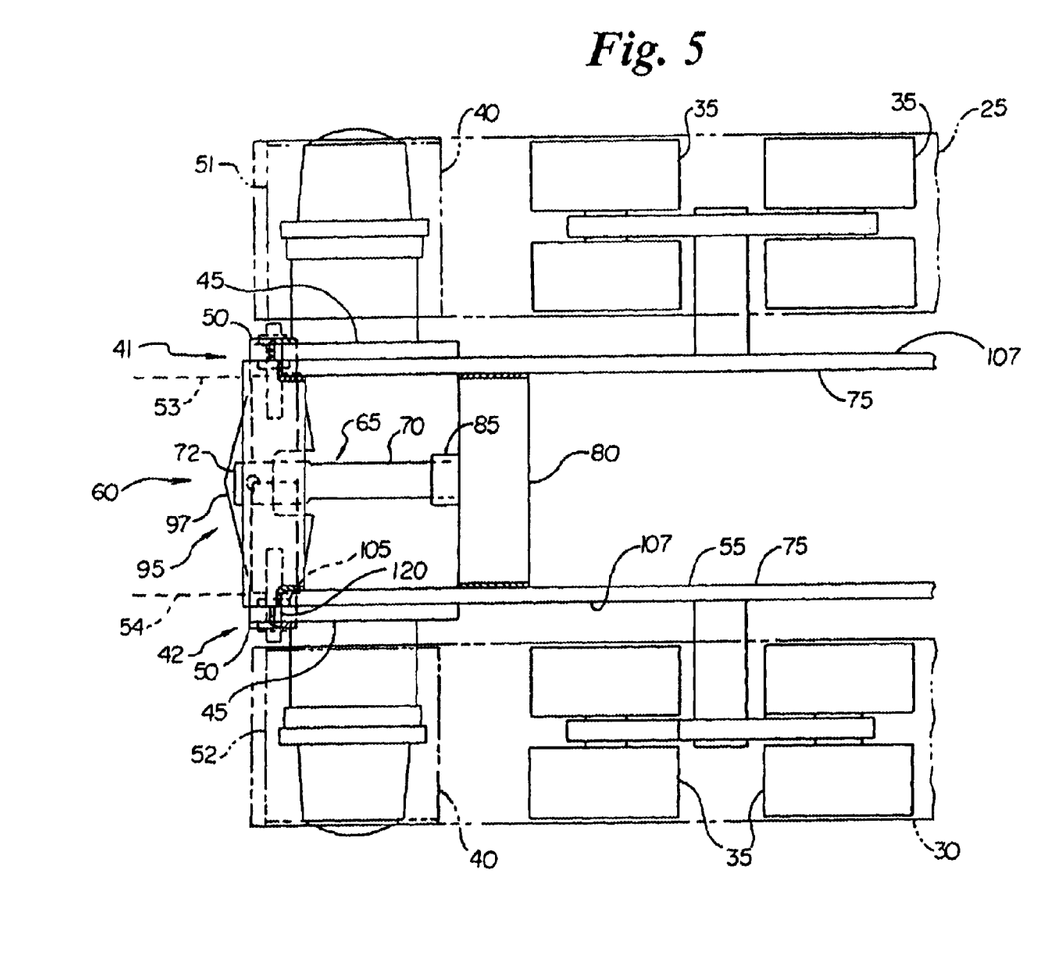
FIG. 5 is a fragmentary top plan view of a track tensioning system.

As shown in FIG. 5, a coupling system, such as a rocker arm assembly or rocker plate assembly 95, pivotably couples the wheel plate assemblies 41, 42 together to balance the tension in the tracks 25, 30. The rocker assembly 95 also couples the wheel plate assemblies 41, 42 to the cylinder assembly 65.

Referring again to FIG. 2, the wheel plate assemblies 41, 42 are each pivotable around a pivot member 50. The pivot 50 is coupled to the structural frame 55 of the machine 20. Each pivot member 50 defines a pivot axis 51, 52 that is substantially parallel to the rotation axis and is displaced from the wheel rotation axis 43. Each side plate 45 pivots through a pivot plane 53, 54 that is perpendicular to the pivot axis 51, as shown in FIG. 5. While the left and right pivot planes 53, 54 as shown are substantially parallel to each other and oriented substantially vertically, other orientations may be used.

To tension the right track shown in FIG. 1, the wheel plate assembly 41 shown in FIG. 2 may be pivoted rearwardly in a track-tensioning arc around the pivot 50 in a clockwise rotation. Conversely, to reduce the track tension, the wheel plate assembly 41 may be pivoted forwardly in a counter-clockwise rotation.

A biasing system for biasing the side plate 45 and tensioning wheel 40 to tension the tracks is shown in FIGS. 3 and 4. A force generating system, such as a hydraulic cylinder assembly 65 or a spring, is coupled to both the frame 55 and the rocker assembly 95. The hydraulic cylinder assembly 65 includes a hydraulic cylinder 70, a piston, and a coupling endcap 72.

Figure 8:
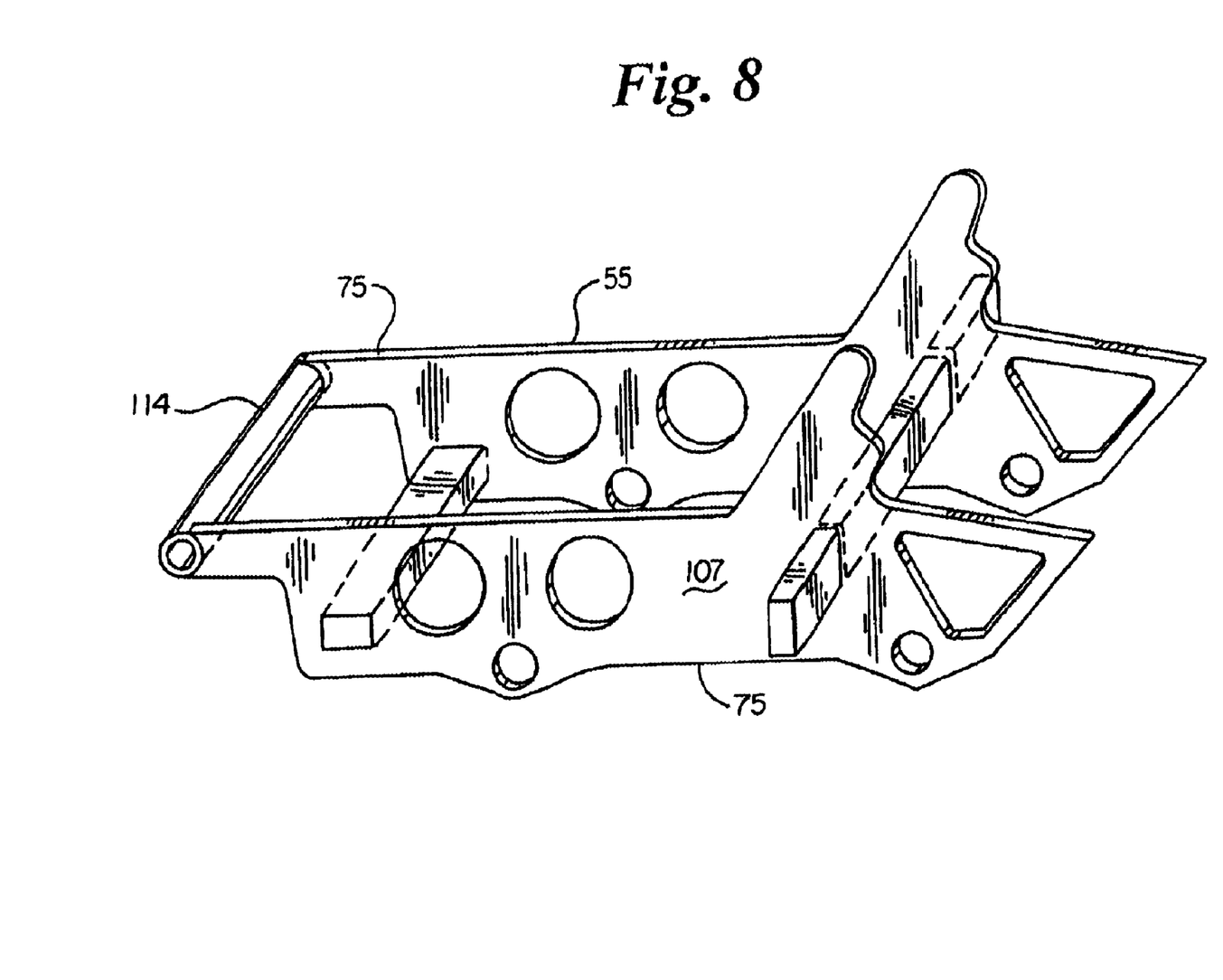
FIG. 8 is a cabinet projection pictorial view of a frame for use with a track tensioning system.

As shown in FIGS. 5 and 8, the frame 55 includes two side members 75 that are connected by a crossmember 80. One end 85 of the hydraulic cylinder assembly 65 is supported by a pocket in the cross-member. The hydraulic cylinder assembly 65 pivots in a generally vertical plane around the pocket-supported end of the cylinder assembly. The other end 90 of the hydraulic cylinder assembly 65 has a cylinder endcap 72 that is coupled to the rocker assembly 95.

Figure 6:
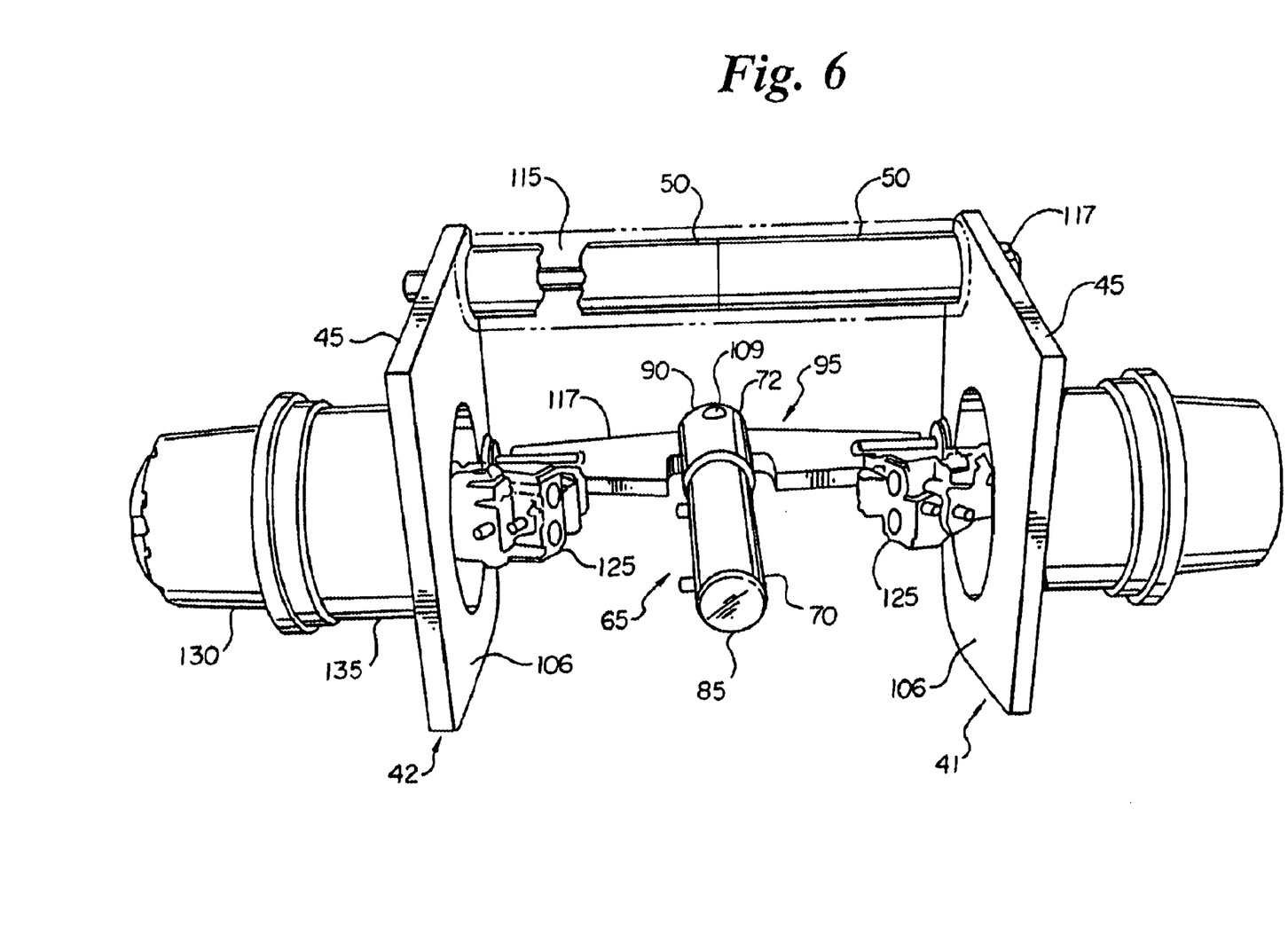
FIG. 6 is a front perspective view of a track tensioning system.
Figure 7:
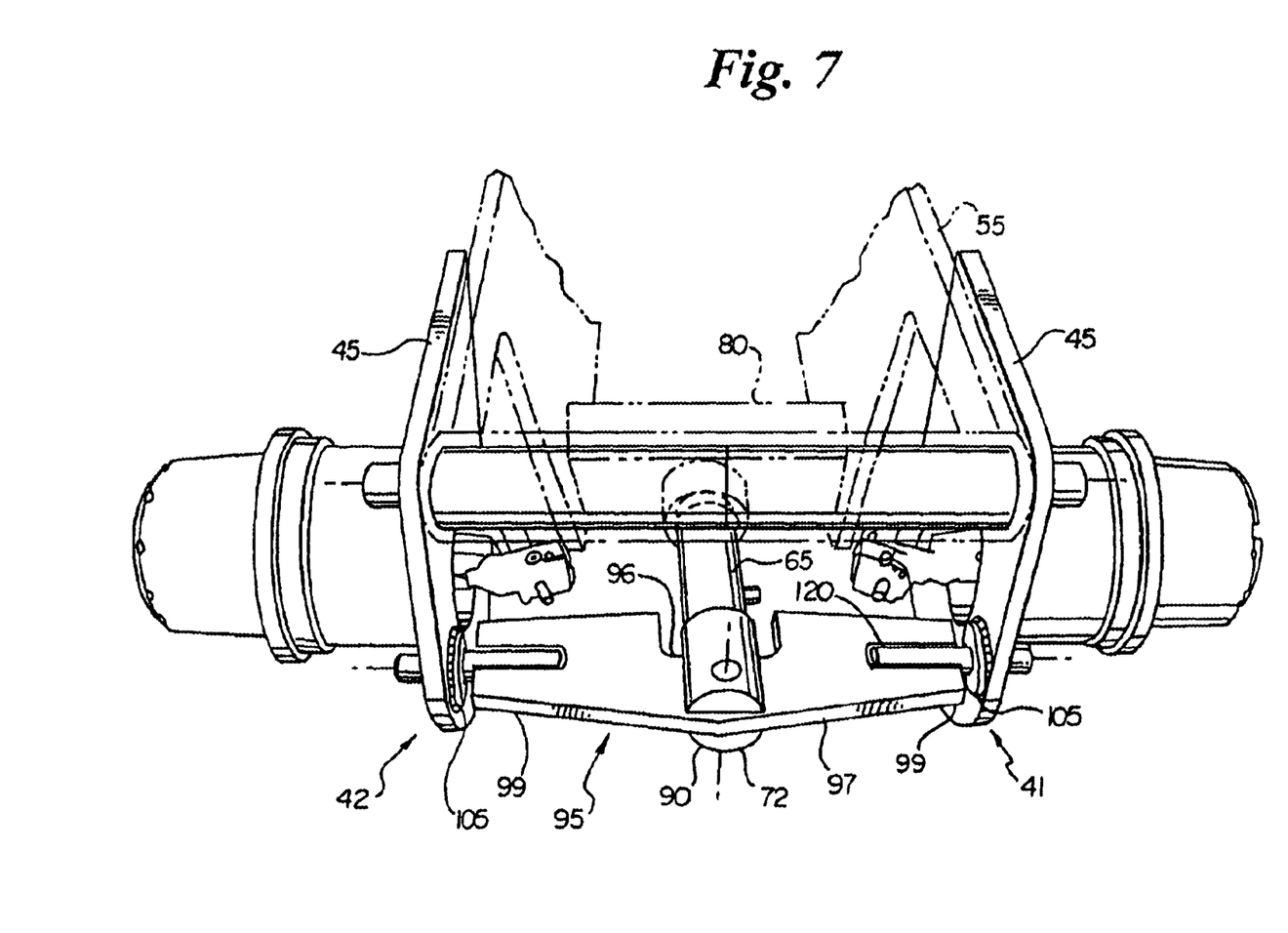
FIG. 7 is a rear perspective view of a track tensioning system.

The rocker assembly 95 includes a rocker arm 97 or rocker plate having an elongated body. The rocker arm body has a middle portion 96 that is coupled to the cylinder endcap 72 and two ends 99 that are coupled to the two side plates 45. As shown in FIGS. 5–7, the cylinder endcap 72 has a slot 98 for receiving the rocker arm 75. The rocker arm 97 is narrowed at the middle portion 96 to permit the rocker arm to pivot without interfering with the cylinder assembly 65. As shown in FIG. 5, the rocker arm 97 has a neutral position in which it is substantially perpendicular to the side plates 45.

Figure 9:
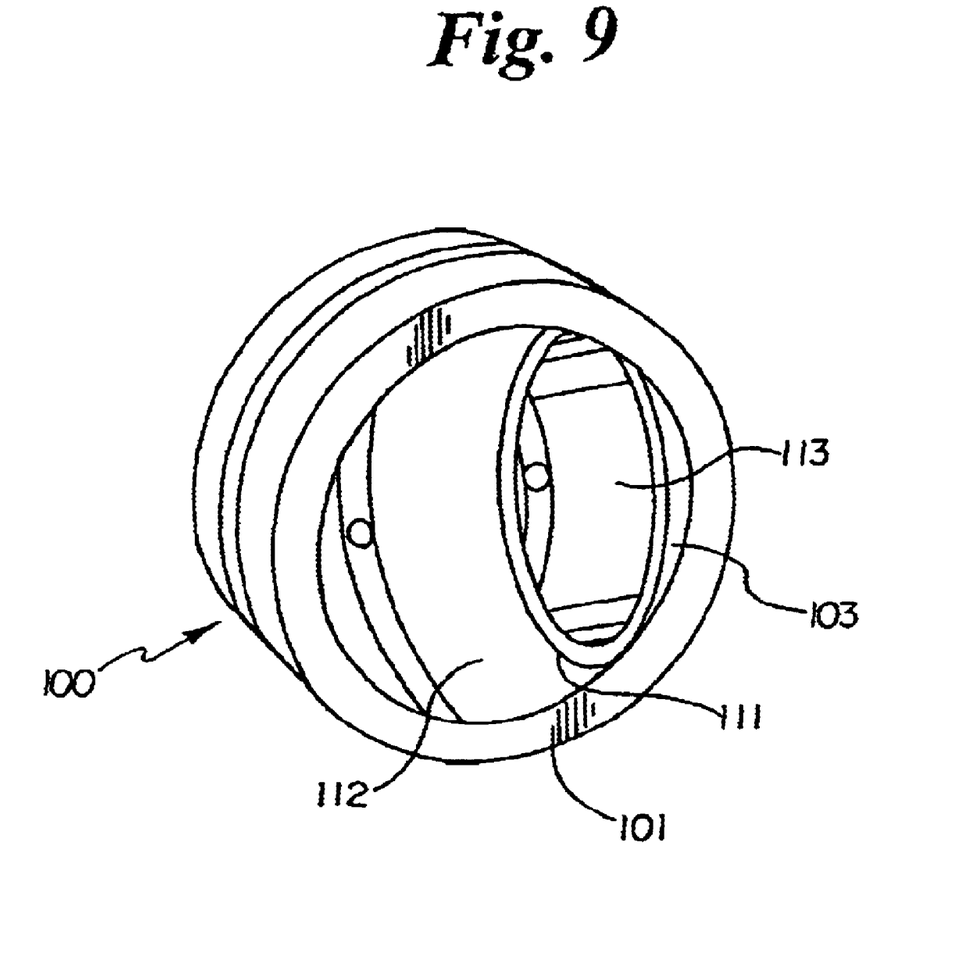
FIG. 9 is a perspective view of a spherical bearing that may be used in a track tensioning system.

The coupling between the hydraulic cylinder assembly 65 and the rocker assembly 95 may be accomplished with a spherical bearing 100, shown in FIG. 9. As shown in FIGS. 6 and 7, the spherical bearing may be pressed into the rocker assembly 95 and coupled to the endcap 72 with a shaft 109. The spherical bearing 100 permits the rocker arm to pivot in three dimensions relative to the endcap 72.

As shown in FIG. 9, the spherical bearing 100 includes an outer ring 101 and an inner ring 111. The outer ring 101 has a cylindrically shaped outer surface 102 and a spherically shaped inner surface 103. The outer surface 112 of the inner ring has a spherical shape that matches the inner surface 103 of the outer ring 101. The inner surface 113 of the inner ring 111 has a cylindrical or tapered bore to accommodate a cylindrical shaft or a tapered shaft.

Spherical bearings may also be used to couple the side plates 45 to the rocker arm 95. As shown in FIG. 6, a spherical bearing 105 may be pressed into the side plates 45 and a shaft 120 may coupled to the spherical bearing and welded to the rocker arm.

Referring to FIG. 6, a pivot member 50 extends inwardly from each side plate 45. One or more bushings 114, shown in FIG. 8, may be coupled to the frame for receiving the pivot members 50. The bushing may be formed for example by integrating into the frame a tube having an inner diameter that is slightly larger than the outer diameter of the pivot member 50. Together, the bushings 114 and pivot members 50 pivotably couple the side plates 45 to the frame 55 so that the side plates and tensioning wheels 40 may be adjusted to tension the tracks.

To maintain proper alignment between the tracks and the wheel plate assemblies, the wheel plate assemblies 41, 42 are slidably supported by the frame. As shown in FIG. 5, the side plates 45 are positioned against the frame 55. An inside surface 106 of each side plate 45 is placed against an outside surface 107 of a frame member or side wall 75. The configuration of the side plates 45 against the frame 55 prevents the side plates 45 and tensioning wheels 40 from moving inwardly out of alignment with the track.

To prevent the side plates from moving outwardly out of alignment with the track, the side plates 45 may be coupled together by one or more tensioning members 117. The rocker arm assembly 95, for example, may function as a tensioning member to locate the side plates 45. As shown in FIG. 7, a portion of the shaft 120 extends through the spherical bearing 105 and protrudes on the outside of the side plate 45. The protruding portion of the shaft 120 may be threaded to receive a nut 122. The nut may be secured on the threaded shaft against the side plates to prevent outward displacement of the side plates under loading from the tracks. To provide additional support, a bolt 115 may be extended through the pivot members 50 and capped by a nut 117 which engages the side plate 45. The bolt 115 provides additional tension force to prevent the side plates 45 and wheels 40 from moving outwardly out of alignment with the tracks.

To adjust the tension in the tracks, the cylinder assembly 65 may be extended or retracted as necessary. For example, to increase the tension in the tracks, the cylinder assembly 65 is extended outwardly to bias the rocker arm 97 and wheel plate assemblies 41, 42 toward the rear of the machine 20. Extending the cylinder assembly 65 from the configuration shown in FIG. 3 to the configuration shown in FIG. 4 will pivot the side plate 45 and wheel 40 to increase the tension in the track.

The hydraulic cylinder 70 may be provided in a constant pressure configuration which provides for automatic tensioning of the track and reduces or eliminates the need for adjustment of the pressure within the hydraulic cylinder during operation of the system. Assuming the system begins in equilibrium with proper tension in both tracks, increasing or decreasing the tension in one or both tracks will generate an automatic response in the tensioning system to adjust the track tension and bring the system back into equilibrium. For example, when the tension in the tracks is decreased below the proper tension, the cylinder assembly 65 will extend outwardly to increase the track tension until the track tension is balanced against the constant pressure in the cylinder. Similarly, when tension in the tracks is increased above the proper tension, the cylinder assembly 65 will retract inwardly to relieve tension in the tracks until the track tension is again balanced against the constant pressure in the cylinder. Because the constant pressure system responds automatically to changes in track tension, there is ordinarily no need for an operator to adjust the cylinder pressure during normal operation of the machine.

The track tensioning system may also balance the tension in the two tracks. Referring again to FIGS. 3 and 4, the side plates 45 and tensioning wheels 40 pivot around the pivot members 50 in generally the same plane as the cylinder assembly 65. Referring now to FIG. 5, because the side plates 45 are coupled together by the rocker assembly 95, pivoting one side plate forwardly tends to cause the other side plate to pivot rearwardly. For example, if the cylinder assembly is held in fixed position, an increase in tension in the right track 30 will cause the rocker assembly 95 to pivot counter-clockwise, affecting a reduction of tension in the right track while increasing the tension in the lower-tensioned left track 25. In this manner, the system may automatically balance the tension in the tracks.

Because the hydraulic cylinder assembly 65 and rocker arm assembly 95 function together to adjust and balance track tension, the system may equally and simultaneously tension both tracks. For example, when the cylinder assembly 65 is configured in a constant pressure arrangement as described above, an increase in tension in the right track 30 will cause the cylinder assembly 65 to retract and will also cause the rocker assembly 95 to pivot counter-clockwise, so that the tension in the right track may be relieved without affecting the tension in the left track 25.

The track tensioning wheels 40 may also function as drive wheels for driving the tracks. For example, the tensioning wheels 40 may be coupled to a hydrostatic drive system. As shown in FIG. 6, a hydraulic motor 125 may be coupled to the track tensioning wheels 40 for powering the wheels and driving the track. A gear system such as a planetary gear system may also be used to provide proper torque and speed drive characteristics in the system. In FIG. 6, the gear system is housed in gear housing 130. A brake system may also be provided in a brake housing 135. The brake system may for example be a multi-disc hydraulic brake system.

Figure 10:
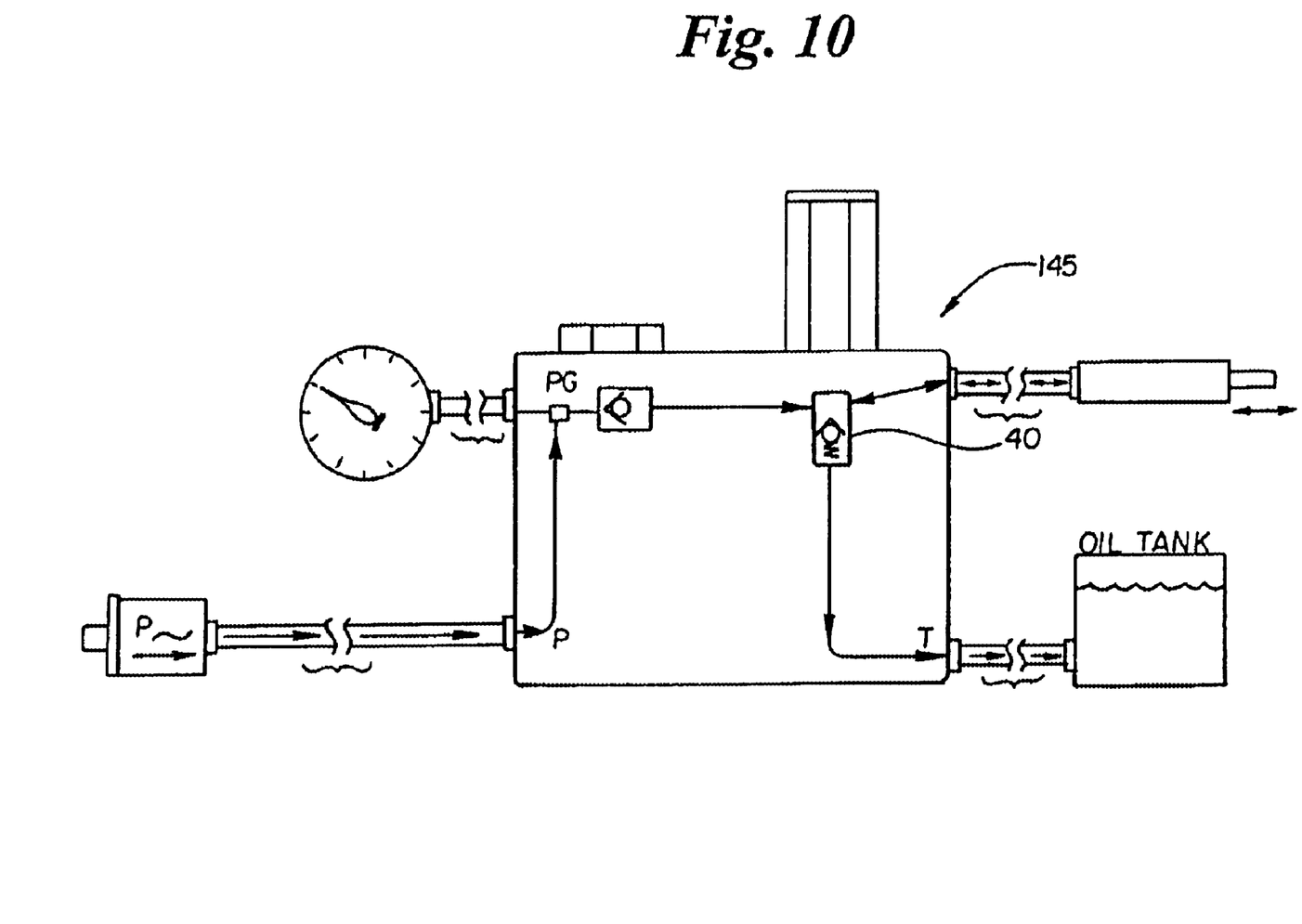
FIG. 10 is a schematic of a hydraulic system for a track tensioning system.

The track tensioning system may advantageously include a relief valve 140 in the hydraulic system 145 for relieving pressure in the cylinder assembly. When the tracked machine 20 is driven into a stationary object, such as a stump, a pressure spike may develop in the hydraulic cylinder 70. To reduce the opportunity for damage to mechanical or hydraulic components, the relief valve 140 will open during a pressure spike to relieve pressure in the hydraulic system and permit rapid retraction of the track tensioning wheel 40. Providing a relief valve may eliminate the need for an accumulator in the hydraulic system. A check valve may also be provided for protecting the pump against pressure spikes.

The track tensioning system may also facilitate simplified service or repair of the drive components. For example, when the hydraulic drive system is coupled to the track tensioning wheel 40, the hydraulic system components may be serviced without de-tracking the vehicle. The hydraulic brake or motor may be removed or replaced simply by retracting the hydraulic cylinder 70 to slacken the tracks. The machine 20 may also advantageously be fitted with rubber tracks, which generally require less maintenance and cause less damage to roadways than metal tracks.

In FIGS. 1 to 5, the track tensioning system is shown located at the rear of the tracked machine 20. The track tensioning system may, however, be located at the rear of the machine. As previously discussed, the opportunity for damage to components when the machine is backed into an unseen stump or other object may be reduced by locating the track tensioning system at the rear of the machine. However, other advantages may be achieved by locating the track tensioning system at the front of the machine. For example, locating the track tensioning system at the front of the machine provides a higher angle of attack to enhance the ability of the machine to travel over obstacles such as logs and rocks. Depending on the intended application for the tracked machine, the track tensioning system may be located either at the front or the rear of the machine.

The above specification and examples provide a description of the manufacture and use of the invention. Since many embodiments of the invention can be made without departing from the spirit and scope of the invention, the invention resides in the claims.

I claim:

1. A track tensioning system for a tracked vehicle having both a frame with left and right side members as well as left and right tracks, both of which tracks are configured to translate along the ground to move the vehicle, the track tensioning system comprising left and right wheel plates located substantially adjacent to a respective side member and left and right wheels that are coupled to respective wheel plates; which left and right wheels are coupled to the left and right tracks and rotate on a rotational axis so that, as the tracks translate along the ground, both wheels rotate with the tracks and, for providing track tensioning to the tracks, each wheel plate pivots against the respective side member of the frame on a pivot axis that is displaced from the rotational axis.

2. The track tensioning system of claim 1 wherein the left and right wheel plates pivot in substantially parallel pivot planes.

3. The track tensioning system of claim 2 wherein the left and right wheel plates pivot in a vertical pivot plane.

4. The track tensioning system of claim 1 wherein the left wheel plate pivots around a left pivot axis and the right pivot plate pivots around a right pivot axis.

5. The track tensioning system of claim 4 wherein the left pivot axis and right pivot axis are collinear.

6. The track tensioning system of claim 1 wherein the left wheel plate and right wheel plate are coupled together with a bolt extending along the pivot axis.

7. The track tensioning system of claim 1 wherein the left wheel plate is pivotably coupled to the frame with a bushing.

8. A system for tensioning a track, the system comprising:
a track tensioning wheel for engaging and tensioning a track tensioning wheel being rotatable around a wheel rotation axis;
a biasing system for providing a track tensioning force;
a frame comprising a planar surface member that defines a pivoting plane; and
a pivoting wheel plate that is coupled to the track tensioning wheel and to the biasing system, the pivoting wheel plate being tensioned against the planar surface member of the frame and being pivotable in the pivoting plane around a pivot axis that is displaced from the wheel rotation axis, wherein the pivoting wheel plate slides substantially against the planar surface member of the frame as the pivoting wheel plate pivots to tension a track.

9. The system of claim 8 further comprising a second pivoting wheel plate and a second track tensioning wheel for engaging a second track, the frame comprising a second planar surface that defines a second pivoting plane, the second pivoting wheel plate being supported against the second planar surface and being pivotable in the second pivoting plane, wherein the second pivoting wheel plate slides against the second planar surface of the frame as the second pivoting wheel plate pivots to tension a second track.

10. The system of claim 9 further comprising a coupling system for coupling the wheel plates together.

11. The system of claim 10 wherein the coupling system comprises a rocker arm that couples the pivoting wheel plate assemblies, wherein the rocker arm pivots to balance the tension in the first and second tracks.

12. The system of claim 11 further comprising side plate spherical bearings that couple the wheel plate assemblies to the rocker arm.

13. The system of claim 8 wherein the pivoting plane is substantially vertical.

14. The system of claim 8 further comprising a pivot tube for coupling the pivoting wheel plate to the frame.

15. The system of claim 14 wherein the frame comprises a frame tube for receiving the pivot tube, the frame tube having an inner diameter that is larger than the outer diameter of the pivot tube for rotatably supporting the pivot tube.

16. A track tensioning system for balancing the track tension forces in left and right tracks on a tracked vehicle, the track tensioning system comprising:
a frame;
a left wheel plate assembly that is coupled to the frame, the left wheel plate assembly comprising a left wheel that is rotatable around a left wheel rotation axis, the left wheel plate assembly being pivotable in a left pivot plane around a left pivot axis that is displaced from the left wheel rotation axis, the left wheel plate assembly being arranged and configured to engage the left track;
a right wheel plate assembly that is coupled to the frame, the right wheel plate assembly comprising a right wheel that is rotatable around a right wheel rotation axis, the right wheel plate assembly being pivotable in a right pivot plane around a right pivot axis that is displaced from the right wheel rotation axis, the right wheel plate assembly being arranged and configured to engage the right track;
a rocker arm member that is coupled to the left and right wheel plate assemblies, and the rocker arm member also being pivotably coupled to the frame;
wherein the rocker arm member transfers track tension forces between the left track and the right track and wherein the left wheel plate assembly and right wheel plate assembly pivot to balance the tension in the tracks.

17. The track tensioning system of claim 16 wherein the left pivot plane is substantially parallel to the right pivot plane.

18. The track tensioning system of claim 17 wherein the left and right pivot planes are substantially vertical.

19. The track tensioning system of claim 17 wherein the rocker arm member has a neutral position in which the rocker arm member is substantially perpendicular to the left and right wheel plate assemblies.

20. The track tensioning system of claim 16 wherein the left and right wheel plate assemblies are each pivotable in three dimensions relative to the rocker arm member.

21. The track tensioning system of claim 20 wherein the left and right wheel assemblies are each coupled to the rocker arm member with a spherical bearing.

22. The track tensioning system of claim 16 wherein the rocker arm member is pivotable in three dimensions relative to the frame.

23. The track tensioning system of claim 22 wherein the rocker arm member is coupled to the frame with a spherical bearing.

24. The track tensioning system of claim 23 wherein the spherical bearing is coupled to a linkage which is coupled to the frame.

25. The track tensioning system of claim 16 wherein the frame comprises a left supporting surface and a right supporting surface, and wherein the left wheel plate assembly is slidably supported by the left supporting surface of the frame and the right wheel plate assembly is slidably supported by the right supporting surface of the frame.

26. The track tensioning system of claim 25 wherein the left wheel plate assembly is laterally displaced a distance from the right wheel plate assembly and wherein the left and right supporting surfaces of the frame prevent the left and right wheel plate assemblies from moving inward out of alignment with the tracks and wherein the rocker arm member prevents the left and right wheel plate assemblies from moving outward out of alignment with the tracks.

27. The track tensioning system of claim 26 wherein the left and right wheel plate assemblies are each coupled to the rocker arm member with a spherical bearing and wherein the system further comprises a shaft coupled to each end of the rocker arm member, each shaft comprising a body for engaging a spherical bearing and a threaded end extending outwardly beyond the spherical bearing, the system further comprising a nut engaged on the threaded end of each shaft.

28. The track tensioning system of claim 26 wherein the system further comprises a bolt that couples the left plate assembly to the right plate assembly.

29. The track tensioning system of claim 16 wherein the left wheel assembly and right wheel assembly each comprise a drive wheel that is coupled to a hydraulic drive motor.

30. The track tensioning system of claim 29 wherein the left wheel assembly comprises a drive plate, a gear system housing coupled to the drive plate, and a gear system contained within the gear system housing, the gear system being coupled to the hydraulic motor and the drive wheel.

31. The track tensioning system of claim 30 wherein the gear system comprises a planetary gear system.

32. The track tensioning system of claim 29 wherein the left wheel rotation axis is substantially parallel to the left pivot axis.

* * * * *

UNITED STATES PATENT AND TRADEMARK OFFICE
CERTIFICATE OF CORRECTION

PATENT NO. : 6,641,235 B2
DATED : November 4, 2003
INVENTOR(S) : Boyum

It is certified that error appears in the above-identified patent and that said Letters Patent is hereby corrected as shown below:

<u>Column 11,</u>
Line 59, "track tensioning wheel" should read -- track, the track tensioning wheel --

Signed and Sealed this

Ninth Day of March, 2004

JON W. DUDAS
*Acting Director of the United States Patent and Trademark Office*